(No Model.)

D. SNYDER & S. C. BEATTY.
LINK OR SPLICE FOR CHAINS.

No. 419,725. Patented Jan. 21, 1890.

WITNESSES:
F. L. Ourand
H. Y. Davis.

INVENTORS:
David Snyder,
Samuel C. Beatty,
by Wm. H. Singerly
Their Attorney.

UNITED STATES PATENT OFFICE.

DAVID SNYDER AND SAMUEL C. BEATTY, OF COLLIERS, WEST VIRGINIA.

LINK OR SPLICE FOR CHAINS.

SPECIFICATION forming part of Letters Patent No. 419,725, dated January 21, 1890.

Application filed November 15, 1889. Serial No. 330,429. (No model.)

*To all whom it may concern:*

Be it known that we, DAVID SNYDER and SAMUEL C. BEATTY, citizens of the United States, residing at Colliers, in the county of Brooke and State of West Virginia, have invented a certain new and useful Improvement in Link and Splice for Chains, of which the following is a full, clear, and exact description.

A primary object of this invention is to furnish an adjunctive link or splice for use in connection with the safety-chain couplings commonly employed on railway-cars when said safety-couplings break, although the invention is applicable to the mending or splicing of chains of other description and for other purposes.

The invention consists of a loop of metal having one or both ends contracted and made substantially parallel, with flat adjacent faces and upper and lower beveled surfaces, and adapted to receive a chain-link flatwise, with the link next adjoining standing crosswise to thereby unite the loop and chain, to adapt the chain to be connected to a hook or similarly to another chain or to the other end of the same chain.

Figure 1:
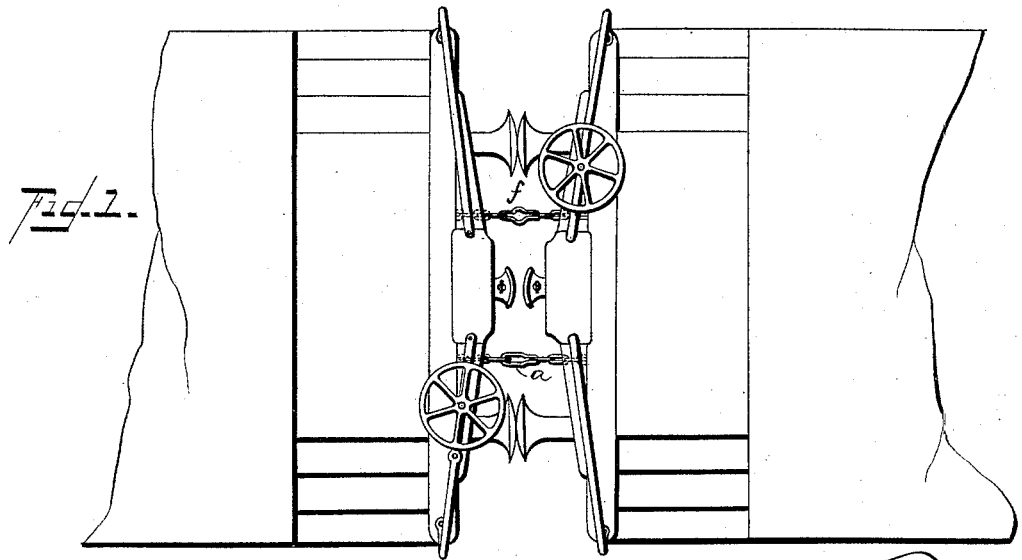
Figure 2:
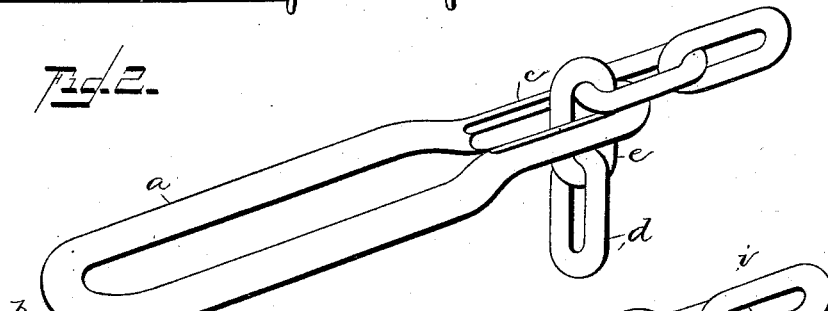
Figure 3:
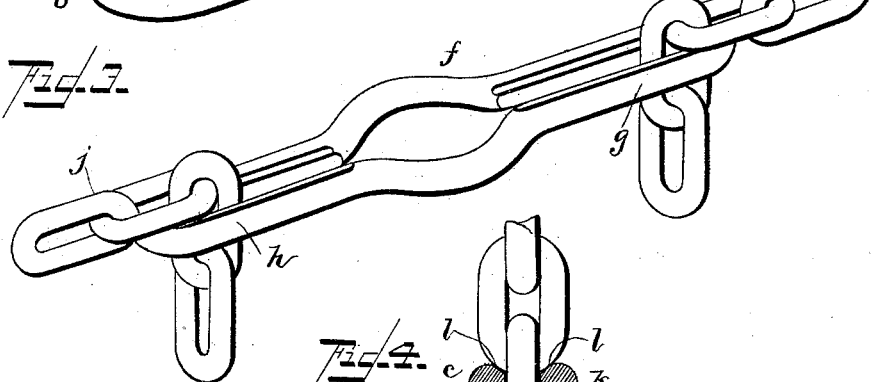
Figure 4:
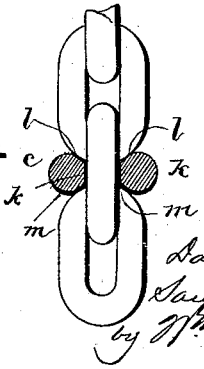

In the accompanying drawings, illustrating our invention, in the several figures of which like parts are similarly designated, Figure 1 is a plan view of two car-platforms. Fig. 2 is a perspective view of the link. Fig. 3 is a perspective view of the splice, and Fig. 4 is a cross-section of the contracted end of either the link or splice, looking toward the end of the said link or splice.

It sometimes occurs that the draw-bars or other coupling apparatus of cars become deranged or broken, or the platform damaged in such way as to render the ordinary coupling means inoperative, and resort is then had to the safety-chain couplings commonly employed on cars for coupling the cars. Such safety-chain couplings consist of short chains provided with hooks on their ends, whereby the chains on opposite cars may be connected. Frequently these safety-chains become damaged by loss of the hooks and from other causes.

One and a main object of our invention is to provide a means whereby, when these safety-chain couplings become damaged, they may be connected or spliced and their utility availed of quickly and with little labor. In case a hook is lost from one of the chains its place may be supplied by means of the link shown in Fig. 2. This link consists of a loop $a$, one end $b$ of which is adapted to be engaged with a hook, and the other end $e$ of which is contracted and its sides made parallel, or substantially so, to form a narrow slot, so that the last link $d$ of a broken chain may be passed through the wider portion of the loop crosswise, and the next link $e$ may be slipped into the slot edgewise or flatwise, as shown in Fig. 2, thus having the link $d$ standing crosswise of the said slot and contracted portion of the link and preventing the escape of the chain from such contracted portion, and so providing for the secure connection of the two chains. The use of the link, as thus described, is shown in the lower portion of Fig. 1. In case the hooks should be gone from both of the chains, then we employ the splice $f$, (shown in Fig. 3,) which is substantially the same thing as the link just described, excepting that both of its ends $g$ and $h$ are contracted and may receive broken chains $i$ and $j$, as just described, of the link. The contracted portions of the link and splice have their adjacent faces $k$ made square, and their upper and lower edges $l$ and $m$, respectively, beveled, in order that short link-chains may be connected, as illustrated in Fig. 4.

The mode of applying the splice is illustrated in the upper portion of Fig. 1, as well as in Fig. 2.

Although we have designed our link and splice especially for use in connection with the safety-chain couplings of railway-cars, yet we desire to state that they may be employed for mending broken chains in other connections, and for connecting opposite ends of chains and other binding mediums.

What we claim is—

1. A loop having one or both of its ends contracted to form a narrow slot or opening, the adjacent faces $k$ of the sides of such slot or opening being made flat and their upper and lower surfaces $l$ and $m$ beveled, substantially as and for the purpose described.

2. The improvement in safety-chain couplings for railway-cars, consisting of a link-like device having one or both of its ends contracted and the sides thereof made parallel, or substantially so, and having adjacent flat faces $k$ and the upper and lower beveled edges $l$ and $m$, and adapted to be applied to the safety-chain couplings, substantially in the manner set forth.

In testimony whereof we have hereunto set our hands this 12th day of November, A. D. 1889.

DAVID SNYDER.
SAMUEL C. BEATTY.

Witnesses:
ALBERT HUNTER,
H. R. STANSBURY.